United States Patent [19]
Johnson

[11] Patent Number: 4,794,344
[45] Date of Patent: Dec. 27, 1988

[54] INJECTED PHASE CONJUGATE LASER AMPLIFIER

[75] Inventor: Michael M. Johnson, Westlake Village, Calif.

[73] Assignee: Rockwell International Corporation, El Segundo, Calif.

[21] Appl. No.: 936,580

[22] Filed: Dec. 1, 1986

[51] Int. Cl.[4] .......................... H01S 3/23; H01S 3/30
[52] U.S. Cl. ........................................ 330/4.3; 372/108
[58] Field of Search ................. 330/4.3; 372/99, 108; 307/428; 350/401, 407

[56] References Cited

U.S. PATENT DOCUMENTS

| | | | |
|---|---|---|---|
| 4,005,935 | 2/1977 | Wang | 356/5 |
| 4,220,928 | 9/1980 | Bloom et al. | 330/4.3 |
| 4,233,571 | 11/1980 | Wang et al. | 331/94.5 |
| 4,280,764 | 7/1981 | Sica, Jr. et al. | 356/35.5 |
| 4,321,550 | 3/1982 | Evtuhov | 330/4.3 |
| 4,344,042 | 8/1982 | Hon | 330/4.3 |
| 4,575,645 | 3/1986 | Komine | 372/108 |
| 4,656,433 | 4/1987 | Franklin et al. | 330/4.3 |
| 4,682,340 | 7/1987 | Dave et al. | 372/108 |

OTHER PUBLICATIONS

S. Refermat, "Variable Ratio Beam . . . Laser Systems", 3/29/78, Proc. Soc. of Photo-Opt. Inst. Eng., pp. 95–100, vol. 140.
S. Chandra, R. C. Fukuda, R. Utano, "Sidearm Stimulated Scattering Phase-Conjugated Laser Resonator", Optics Letters, vol. 10, No. 7, Jul. 1985.
I. Liberman, "Application of Phase Conjugation to $CO_2$ Fusion Lasers", SPIE, vol. 190, LASL Optics Conference, 1979.
C. R. Giuliano, R. D. Lind, T. R. O'Meara and G. C. Valley, "Can Phase Conjugate Resonators Enhance Laser Performance?", Laser Focus, pp. 55–64, Feb. 1983.
R. G. Caro and M. C. Gower, "Amplified Phase Conjugate Reflection of KrF Laser Radiation", Applied Physics, vol. 39, No. 11, Dec. 1, 1961.
N. G. Basov et al., "Prospects of High Power Lasers Using Stimulated Scattering", Paper SU-117924, U.S.S.R.
M. C. Gower and R. G. Caro, "Phase Conjugate Reflection of KrF Laser Radiation", Paper
A. A. Betin et al., "Calculation of Energy Characteristics of Double-Passage Amplifier", Abstract from USSR Report, Electronics and Electrical Engineering, JPRS-UEE-84-014, Oct. 15, 1984.
I. D. Carr and D. C. Hanna, "Performance of a Nd:YAG Oscillator/Amplifier with Phase-Conjugation via Stimulated Brillouin Scattering", Applied Physics B, 36, 83–92 (1985).
C. R. Giuliano, "Applications of Optical Phase Conjugation", Physics Today, pp. 27–35, Apr. 1981.
M. C. Gower and R. G. Caro, "KrF Laser with a Phase-Conjugate Brillouin Mirror", Optics Letters, vol. 7, No. 4, pp. 162–164, Apr. 1962.
M. Gower, "Mirrors That Reflect Time", Nature, vol. 308, pp. 110–111, Mar. 8, 1984.

*Primary Examiner*—Nelson Moskowitz
*Attorney, Agent, or Firm*—H. Fredrick Hamann; Harry B. Field; Lawrence N. Ginsberg

[57] ABSTRACT

An apparatus 10 and method for producing a high-energy laser beam 14'''. A low-power, good quality, input laser beam 14 is produced by master oscillator 12. The low-power beam 14 is focused at an input focal point 20 and reflected from turning flat 22 to a power amplifier 24 where it is amplified to a moderate power level. It is then transmitted through a polarization beam splitter 28 and its optical path length adjusted by adjustment means 30,32,34,36 prior to being directed to a phase conjugator 44. A quarter-wave plate 40 causes the phase conjugated returning beam 14'' to be orthogonally polarized thereby reflecting it from polarization beam splitters 38,28. Beam 14'' is then passed through the power amplifier 24 and focused at an output focal point 50 in a vacuum. The resultant high-power output beam 14''' is produced without significant degradation in the beam quality.

16 Claims, 1 Drawing Sheet

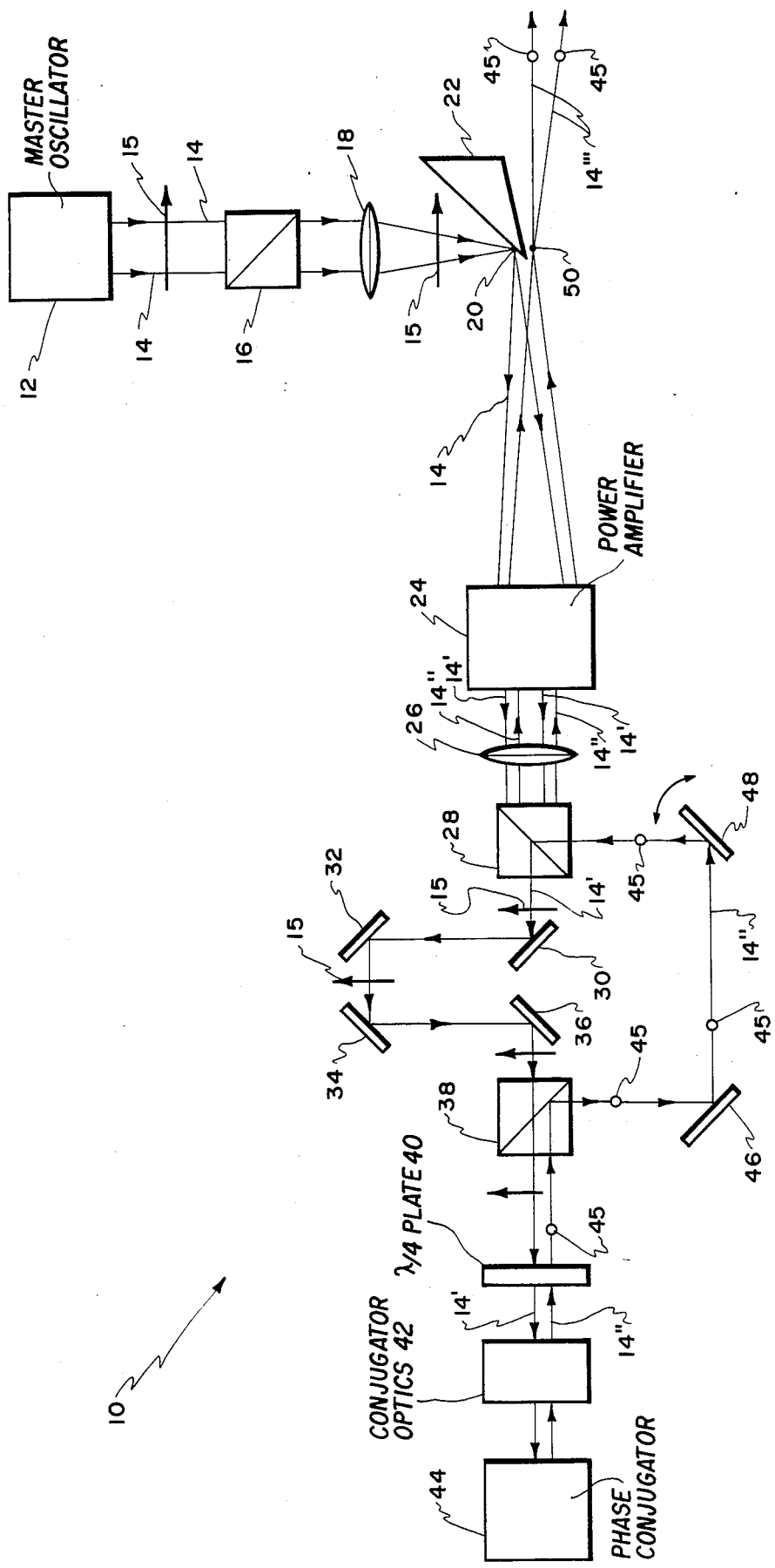

INJECTED PHASE CONJUGATE LASER AMPLIFIER

BACKGROUND OF THE INVENTION

1. Field of the Invention

This invention relates to laser amplifiers and more particularly to a method and apparatus for utilizing a phase conjugator for producing a high optical quality and high power laser beam.

2. Description of the Prior Art

In the past, phase conjugation has been used to correct phase aberrations in double-pass amplifiers, beam trains and atmospheric paths. For example, U.S. Pat. No. 4,005,935 issued to V. Wang entitled, "Method and Apparatus and Providing a Phase Compensated Optical Beam" discloses an energy pulse transmitted toward a target. A portion of the energy reflected from the target is received, processed so as to be back-scattered from a Brillouin mirror, amplified and then retransmitted along a path coincident with the received beam. The back-scattered energy from the Brillouin mirror is the complex phase conjugate of the received pulse and consequently the second transmitted pulse is phase encoded such that the effects of phase perturbations encountered along the received path are substantially cancelled, and near diffraction-limited convergence of the beam upon the target is obtained.

Experimental verification of a phase conjugate Brillouin mirror in a double-pass KrF laser amplifier system has been accomplished as disclosed in the article entitled, "KrF Laser with a Phase Conjugate Brillouin Mirror" by M. C. Gower and R. G. Caro in Optics Letters, Vol. 7, No. 4 April 1982. The phase-conjugate Brillouin mirror was used to compensate for aberrations and to produce a diffraction-limited output beam.

Phase conjugation via stimulated Brillouin scattering in $CH_4$ gas has been used to correct amplifier aberrations in a Nd:YAG oscillator/amplifier system. (See "Performance of a Nd:YAG Oscillator/Amplifier with Phase Conjugation via Stimulated Brillouin Scattering" by I. D. Carr and D. C. Hanna, Applied Physics B Vol. 36, pages 83-92 (1985)).

The use of a frequency shifter with a double-pass/amplifier phase conjugation system to correct for optical distortions caused by the optics and laser amplifier to produce a nearly diffraction-limited high-power light beam impinging upon a target has been disclosed. U.S. Pat. No. 4,321,550 issued to V. Evtuhov entitled, "Phase Conjugate Correction for High Gain Amplifier Systems". (See also the article entitled, "Can Phase Conjugate Resonators Enhance Laser Performance?" by C. R. Giuliano, R. C. Lind, T. R. O'Meara and G. C. Valley, Laser Focus, (February 1983) pages 55-64.) Frequency shifting is important only in the event the stimulated Brillouin scattering reflection shifts the frequency outside the linewidth of the amplifier.

All of the above-mentioned double-pass/amplifier systems utilize either a partially reflective or polarizing beam splitter to separate the input and output beams. In a high-power system the beam splitter could likely be damaged by the high-power output beam.

The article entitled, "Applications of Optical Phase Conjugation" by C. R. Giuliano, Physics Today (April 1981) FIG. 7, page 34, discloses the utilization of polarization beam splitters to separate reference and phase conjugate waves. A reference wave of one polarization is transmitted through a first and then a second polarization beam splitter. It is then phase conjugated and its polarization altered such that the return beam is reflected by the second polarization beam splitter onto a separate path containing a focus control and tilt control. The beam is then reflected by the first polarization beam splitter and back in the line of the reference wave. This physical separation of the reference and phase conjugated beams allows possible refocusing and beam steering.

Use of a focus control, such as illustrated in the "Physics Today" article would not be applicable with a double-pass amplifier using a phase conjugator because it would prevent the phase conjugate beam from retracing the path of the reference beam thereby preventing cancellation of the amplifier aberrations. Similarly, a large tilt would degrade the system performance.

OBJECTS OF THE INVENTION

A principal object of the invention therefore is to produce a high optical quality and high power laser beam.

Another object is to allow a small angle steering of the high power laser beam by controlling a tilt control mirror in the moderate power leg of the amplifier.

Other objects, advantages and novel features of the present invention will become apparent from the following detailed description of the invention when considered in conjunction with the accompanying drawing.

SUMMARY OF THE INVENTION

The present invention provides a method and apparatus for producing a high-energy laser beam. In its broadest aspects, the invention entails producing a low power, good quality, input laser beam. The input beam is focused at an input focal point and then reflected into a power amplifier. The power amplifier amplifies the lower power beam to a moderate power level. The moderate power level beam is then directed to a phase conjugator and then redirected through the power amplifier thereby raising it to a high power level. The invention includes beam separation means for separating the low-power input laser beam from the high-power output laser beam, the high-power output laser beam being focused at an output focal point displaced from the input focal point. The output focal point is in a vacuum. The high-power output beam is produced without significant degradation in the beam quality.

In a preferred embodiment, the low-power input laser beam is separated from the high-power output laser beam as follows:

The moderate power level laser beam is directed to a first polarization beam splitter prior to it being phase conjugated. After it is transmitted by the first polarization beam splitter its path length is adjusted and it is then directed through a second polarization beam splitter and then through a quarter-wave plate prior to being phase conjugated. After this moderate power level laser beam is phase conjugated, it is directed back through the quarter-wave plate and to the second polarization beam splitter whereupon it is reflected therefrom. The path length of the phase conjugated moderate power level beam is adjusted and the beam is reflected from the first polarization beam splitter back through the power amplifier.

BRIEF DESCRIPTION OF THE DRAWING

The sole Figure is a schematic diagram of the apparatus of the present invention.

The same elements or parts throughout the figures of the drawings are designated by the same reference characters, while equivalent elements bear a prime designation.

DETAILED DESCRIPTION OF THE INVENTION

System Arrangement

Referring to the sole Figure, an apparatus 10 designates a preferred embodiment of the present invention for amplifying a high-energy laser beam. Apparatus 10 includes a master oscillator 12 for producing a low-power, good quality input laser beam 14. It is polarized in a first direction as shown by arrow 15. The low-power input laser beam 14 is directed to a polarization beam splitter 16 which optically isolates beam 14 from any return beam which is not phase conjugated. Beam 14 is then focused by focusing lens 18 to a small (near diffraction limited) spot at input focal point 20 near the edge of the reflecting means or injection turning flat 22. Beam 14 is reflected from the turning flat 22 and expands into a power amplifier 24. The laser amplifier 24 is an injectable amplifier with a gain medium which has a gain profile capable of supporting the lasing frequency of the master oscillator 12 before and after phase conjugation. Due to optical inhomogeneities phase aberrations are introduced onto beam 14. Upon exiting the amplifier 24 the resulting moderate power laser beam 14' is collimated by a focusing lens 26 and transmitted through a polarization beam splitter 28. The beam 14' is then reflected off of turning flats or mirrors 30, 32, 34, 36 which are utilized to obtain a required path length. The moderate power beam 14' is then transmitted through another polarization beam splitter 38 toward a quarter-wave plate 40. After passing through the quarter-wave plate 40 the moderate power beam 14' is directed by conjugator optics 42 which couple the beam 14' into a phase conjugator or conjugate reflector 44. The conjugator optics 42 may be, for example, a simple focusing lens or two element telescope.

Two possible forms of phase conjugators 44 may be, for example: (1) a liquid or gas cell pumped by two counter-propagating laser beams at the input laser wavelength resulting in degenerative four-wave mixing, or (2) a liquid or gas cell with no external pump beams, which employs stimulated Brillouin scattering to achieve conjugation of the input beam.

The resulting phase conjugated moderate power level beam 14" is directed back through the conjugator optics 42 and the quarter-wave plate 40. The double-pass through the quarter-wave plate makes the polarization of beam 14" perpendicular to beam 14' as indicated by circles 45. Because of its new polarization, beam 14" is reflected by polarization beam splitter 38 and is thus directed to a lower pair of turning flats 46,48. The path length for the phase conjugated moderate power level beam 14" from polarization beam splitter 38 to polarization beam splitter 28 is equal to the path length for the moderate power level beam 14' from polarization beam splitter 28 to polarization beam splitter 38.

After beam 14" is reflected off of turning flats 46,48 it is reflected from polarization beam splitter 28 toward the power amplifier 24 where it is amplified to a high power level. This high power level laser beam 14''' is focused at output focus point 50, just missing the edge of the injection turning flat 22. If such a beam separation technique were not utilized and the beam 14" was reflected back through the amplifier the resultant high power level laser beam 14''' would travel along the same path as the incoming low-power beam 14 and thus be directed back toward the master oscillator 12.

The lateral displacement of the two foci 20,50 can be achieved by proper alignment of either turning flat 48 or polarization beam splitter 28.

System Alignment

With the power amplifier 24 off, the input and output beams 14', 14''' are aligned so that the input and output foci 20,50 are coincident. During this portion of the alignment phase, the phase conjugator 44 is replaced by a conventional mirror. The final step in the alignment is the placement of a small tilt on the tilt control mirror(s) 46,48 (or one of the polarization beam splitters) such that the output focus 50 just misses the edge of the injection turning flat.

With the system properly aligned, the conventional mirror is replaced by the phase conjugating reflector 44 and the power amplifier 24 is turned on.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An apparatus for amplifying a laser beam, comprising:
    means for producing an input laser beam at an input power level;
    means for focussing said input beam at an input focal point;
    reflecting means for directing said input laser beam into a power amplifier, said power amplifier for amplifying said input laser beam to a moderate power level between said input power level and an output power level;
    phase conjugating means for redirecting the moderate power laser beam back through said power amplifier thereby amplifying said moderate power laser beam to said output power level; and
    beam separation means for separating the input laser beam from the higher power output laser beam, the output laser beam being focused at an output focal point displaced from the input focal point, the output focal point being in a vacuum; whereby,
    the output laser beam is produced with essentially no degradation of its spatial coherence.

2. The apparatus of claim 1 wherein said beam separation means includes:
    a first polarization beam splitter for receiving the moderate power level laser beam from said power amplifier prior to it being phase conjugated;
    a first optical pathlength adjusting means for receiving the moderate power level laser beam from said first polarization beam splitter and adjusting the pathlength of said moderate power level laser beam;
    a second polarization beam splitter for receiving the moderate power level laser beam from said optical pathlength adjusting means;

a quarter-wave plate for receiving the moderate power laser beam from said second polarization beam splitter and transmitting said beam to said phase conjugating means, the resultant phase conjugated beam then being directed back through said quarter-wave plate and subsequently reflected by said second polarization beam splitter; and a second optical path adjusting means for receiving the phase conjugated moderate power level beam which is reflected by said second polarization beam splitter, said second optical path length adjusting means for adjusting the pathlength of said phase conjugated moderate power level laser beam, and directing it to said first polarization beam splitter, wherein it is reflected therefrom and directed back through said power amplifier.

3. The apparatus of claim 2 wherein said first and second optical pathlength adjusting means provide equal pathlengths for the moderate power level laser beam prior to it being phase conjugated and after it is phase conjugated.

4. The apparatus of claim 3 wherein said first optical pathlength adjusting means includes four turning flats.

5. The apparatus of claim 4 wherein said second optical pathlength adjusting means includes two turning flats.

6. The apparatus of claim 3 further including a third polarization beam splitter located between said means for producing said input laser beam and said means for focusing said input laser beam.

7. The apparatus of claim 3 further including a focusing lens located between said power amplifier and said first polarization beam splitter.

8. The apparatus of claim 3 further including conjugating optics located between said quarter-wave plate and said phase conjugating means.

9. The apparatus of claim 3 wherein said phase conjugating means includes four-wave mixing.

10. The apparatus of claim 3 wherein said phase conjugating means includes stimulated Brillouin scattering.

11. A method for producing an amplified laser beam, comprising:

producing an input laser beam at an input power level;

focusing said input laser beam at an input focal point;

amplifying said input laser beam to a moderate power level between said input power level and an output power level;

phase conjugating said moderate power level laser beam;

directing the phase conjugated moderate power laser beam back through said power amplifier thereby amplifying it to said output power level; and separating the input laser beam from the output laser beam, the output laser beam being focused at an output focal point displaced from the input focal point, the output focal point being in a vacuum; whereby, the output laser beam is produced with essentially no degradation of its spatial coherence.

12. The method of claim 11 wherein the input laser beam is separated from the output laser beam by:

directing the moderate power level laser beam to a first polarization beam splitter prior to it being phase conjugated;

adjusting the path length of said moderate power laser beam after it is transmitted by said first polarization beam splitter;

directing the path length adjusted moderate power level laser beam through a second polarization beam splitter and then through a quarter-wave plate prior to being phase conjugated;

directing the phase conjugated moderate power level laser beam back through said quarter-wave plate and to said second polarization beam splitter whereupon it is reflected therefrom;

adjusting the path length of said phase conjugated moderate power level laser beam; and reflecting said phase conjugated moderate power level laser beam from said first polarization beam splitter and back through said power amplifier.

13. The method of claim 12 wherein the moderate power level laser beam is adjusted so that it has an equal optical path length prior to and after being phase conjugated.

14. The method of claim 13 wherein the adjustments in optical path lengths are performed by a plurality of turning flats.

15. The method of claim 13 wherein the input laser beam is directed through a third polarization beam splitter prior to being focused at said input focal point.

16. The method of claim 13 further including the step of directing the moderate power level laser beam through a focusing lens prior to it being directed to said first polarization beam splitter.

* * * * *